US012589729B2

(12) United States Patent
Senft et al.

(10) Patent No.: US 12,589,729 B2
(45) Date of Patent: Mar. 31, 2026

(54) LOAD BALANCING APPROACH TO EXECUTE COST OPTIMIZATION IN MULTI-MODE AND MULTI-GEAR HYBRID ELECTRIC VEHICLES

(71) Applicant: FCA US LLC, Auburn Hills, MI (US)

(72) Inventors: Stefan Senft, Essen (DE); Gokul Maharaj Badrinath, Shelby Township, MI (US); Andryas Mawardi, Rochester, MI (US); Nadirsh Patel, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 195 days.

(21) Appl. No.: 18/499,390

(22) Filed: Nov. 1, 2023

(65) Prior Publication Data

US 2025/0136082 A1 May 1, 2025

(51) Int. Cl.
*B60W 40/08* (2012.01)
*B60W 20/20* (2016.01)
*B60W 20/30* (2016.01)

(52) U.S. Cl.
CPC ............ *B60W 20/30* (2013.01); *B60W 20/20* (2013.01)

(58) Field of Classification Search
CPC .... B60W 20/30; B60W 20/20; B60W 30/188; B60W 50/04
See application file for complete search history.

(56) References Cited

U.S. PATENT DOCUMENTS

| | | | | |
|---|---|---|---|---|
| 10,933,752 | B2 * | 3/2021 | Miller | B60L 7/18 |
| 11,501,160 | B2 * | 11/2022 | Cho | G06N 3/04 |
| 2018/0314250 | A1 * | 11/2018 | Lewis | G06N 3/008 |
| 2021/0179138 | A1 * | 6/2021 | Terazawa | G01C 21/3476 |
| 2024/0427325 | A1 * | 12/2024 | Elliott | G06N 3/006 |
| 2025/0117251 | A1 * | 4/2025 | Colter | G06F 9/4881 |

FOREIGN PATENT DOCUMENTS

CN       103323775  A       9/2013

OTHER PUBLICATIONS

Towards a Load Balancing Middleware for Automotive Infotainment Systems—Yara Khaluf and Achim Rettberg (Year: 2009).*

* cited by examiner

*Primary Examiner* — Masud Ahmed
(74) *Attorney, Agent, or Firm* — Jeremy J. Klobucar

(57) ABSTRACT

A control technique for balancing controller computational processing loads in a vehicle includes determining a set of allowed functions from a plurality of functions executable by the controller based on a set of constraints corresponding to a set of operating parameters of the vehicle, dividing the set of allowed functions into a plurality of subsets to obtain a plurality of subsets of allowed functions, based on offline testing data relating to runtimes of the plurality of functions, equally assigning the plurality of subsets of allowed functions across N instances of the function trigger, wherein N is an integer greater than one, and executing the set of allowed functions across the N instances of the function trigger as equally assigned to balance a computational load on the controller.

20 Claims, 2 Drawing Sheets

LOAD BALANCING APPROACH TO EXECUTE COST OPTIMIZATION IN MULTI-MODE AND MULTI-GEAR HYBRID ELECTRIC VEHICLES

FIELD

The present application generally relates to vehicle control systems and, more particularly, to a load balancing approach to execute controller-based cost optimization in vehicles such as electrified vehicles.

BACKGROUND

Today's vehicles are becoming more and more complex. One example of a particularly complex vehicle is an electrified vehicle, such as a hybrid electric vehicle (HEV), configured with autonomous and/or advanced driver-assistance (ADAS) functionalities. These complex vehicles often have controllers that want to execute multiple different functions simultaneously. Based on the operating conditions, the controller could become overloaded, which could result in some functions being delayed or skipped or disallowed entirely. Conventional solutions to this problem aim to optimize specific algorithms or functions, but there is no solution that addresses the load imbalance that could occur in a controller while it is executing multiple functions whose execution depends dynamically on the operating conditions. Accordingly, while such conventional vehicle control systems do work well for their intended purpose, there exists an opportunity for improvement in the relevant art.

SUMMARY

According to one example aspect of the invention, a control system for balancing controller computational processing loads in a vehicle is presented. In one exemplary implementation, the control system comprises a controller configured to control operation of the vehicle including executing at least some of a plurality of functions in response to a function trigger corresponding to a particular operating condition of the vehicle and a memory configured to store offline testing data captured by offline testing of the controller executing the plurality of functions, the offline testing data indicating runtimes of the plurality of functions, wherein the controller is further configured to determine a set of allowed functions from the plurality of functions based on a set of constraints corresponding to a set of operating parameters of the vehicle, divide the set of allowed functions into a plurality of subsets to obtain a plurality of subsets of allowed functions, based on the offline testing data, equally assign the plurality of subsets of allowed functions across N instances of the function trigger, wherein N is an integer greater than one, and execute the set of allowed functions across the N instances of the function trigger as equally assigned to balance a computational load on the controller.

In some implementations, N equals a maximum number of instances of the function trigger per cycle of the controller. In some implementations, during each cycle of the controller, the controller is further configured to in response to a first instance of the function trigger, determine the set of allowed functions, based on the offline testing data, equally assign the plurality of subsets of allowed functions over a remainder of the first instance of the function trigger, if any, and over a remainder of the N instances of the function trigger, and execute the set of allowed functions as equally assigned and determine a final decision for the set of allowed functions thereafter. In some implementations, during each cycle of the controller, the controller is further configured to in response to a first instance of the function trigger, determine the set of allowed functions, based on the offline testing data, equally assign the plurality of subsets of allowed functions over a remainder of the N instances of the function trigger, and execute the set of allowed functions as equally assigned and determine a final decision for the set of allowed functions thereafter.

In some implementations, the controller is further configured to determine a total computational load on the controller by summing the runtimes of the set of allowed functions as indicated by the offline testing data, determine an average computational load on the controller by dividing the total computational load by N, and equally assign the plurality of subsets of allowed functions based on the average computational load on the controller. In some implementations, the controller is configured to equally assign the plurality of subsets of allowed functions by assigning the plurality of subsets of allowed functions such that a total computation load per instance is as close to the average computational load on the controller as possible. In some implementations, the vehicle is an electrified vehicle. In some implementations, the vehicle is a hybrid electric vehicle (HEV) having a multi-gear automatic transmission and a multi-mode powertrain.

According to another example aspect of the invention, a control method for balancing controller computational processing loads in a vehicle is presented. In one exemplary implementation, the control method comprises providing a controller configured to control operation of the vehicle including executing at least some of a plurality of functions in response to a function trigger corresponding to a particular operating condition of the vehicle, providing a memory configured to store offline testing data captured by offline testing of the controller executing the plurality of functions, the offline testing data indicating runtimes of the plurality of functions, determining, by the controller, a set of allowed functions from the plurality of functions based on a set of constraints corresponding to a set of operating parameters of the vehicle, dividing, by the controller, the set of allowed functions into a plurality of subsets to obtain a plurality of subsets of allowed functions, based on the offline testing data, equally assigning, by the controller, the plurality of subsets of allowed functions across N instances of the function trigger, wherein N is an integer greater than one, and executing, by the controller, the set of allowed functions across the N instances of the function trigger as equally assigned to balance a computational load on the controller.

In some implementations, N equals a maximum number of instances of the function trigger per cycle of the controller. In some implementations, the control method further comprises during each cycle of the controller: in response to a first instance of the function trigger, determining, by the controller, the set of allowed functions, based on the offline testing data, equally assigning, by the controller, the plurality of subsets of allowed functions over a remainder of the first instance of the function trigger, if any, and over a remainder of the N instances of the function trigger, and executing, by the controller, the set of allowed functions as equally assigned and determine a final decision for the set of allowed functions thereafter. In some implementations, the control method further comprises during each cycle of the controller: in response to a first instance of the function trigger, determining, by the controller, the set of allowed functions, based on the offline testing data, equally assigning, by the controller, the plurality of subsets of allowed functions over a remainder of the N instances of the function trigger, and executing, by the controller, the set of allowed functions as equally assigned and determine a final decision for the set of allowed functions thereafter.

In some implementations, the control method further comprises determining, by the controller, a total computational load on the controller by summing the runtimes of the set of allowed functions as indicated by the offline testing data, determining, by the controller, an average computational load on the controller by dividing the total computational load by N, and equally assigning, by the controller, the plurality of subsets of allowed functions based on the average computational load on the controller. In some implementations, equally assigning the plurality of subsets of allowed functions includes assigning, by the controller, the plurality of subsets of allowed functions such that a total computation load per instance is as close to the average computational load on the controller as possible. In some implementations, the vehicle is an electrified vehicle. In some implementations, the vehicle is an HEV having a multi-gear automatic transmission and a multi-mode powertrain.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, today's complex vehicles often have controllers that want to execute multiple different functions simultaneously. Based on the operating conditions, the controller could become overloaded, which could result in some functions being delayed or skipped or disallowed entirely. Conventional solutions to this problem aim to optimize specific algorithms or functions, but there is no solution that addresses the load imbalance that could occur in a controller while it is executing multiple functions whose execution depends dynamically on the operating conditions.

Accordingly, improved vehicle control systems and methods are presented herein. These techniques split or divide a plurality of function executions into smaller subsets. These subsets of function executions can be executed across multiple function call triggers to balance the computational load of the controller such that the load-per-trigger is close to average. This includes initially testing offline to determine the runtimes of various functions. Then, in a first function trigger, allowed functions are calculated based on various constraints. An average load per function trigger is calculated by summing the offline/online runtimes for various functions and dividing by the maximum number of function triggers. Thereafter, for each function trigger (from 1 to N), subsets of functions are assigned such that the difference between function runtime and the remaining load for that trigger is minimized.

Figure 1:
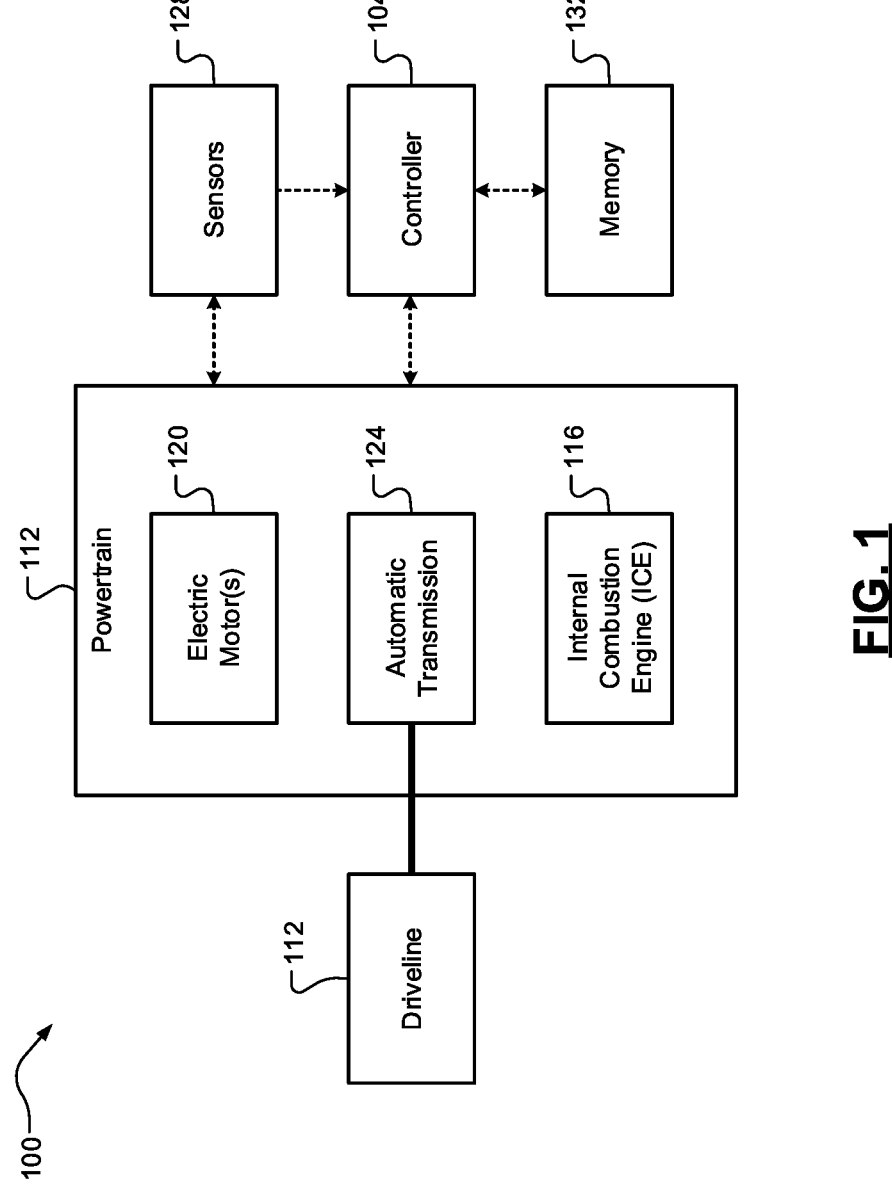
FIG. 1 is a functional block diagram of a vehicle having an example control system for balancing controller computational processing loads according to the principles of the present application.

Referring now to FIG. 1, a functional block diagram of a vehicle 100 having an example control system 104 (or controller 104) for balancing controller computational processing loads according to the principles of the present application is presented. The vehicle 100 generally comprises a powertrain 108 configured to generate and transfer drive torque to a driveline 112 for vehicle propulsion. The vehicle 100 could be an electrified vehicle, such as an HEV, but it will be appreciated that the vehicle 100 could also be a conventional internal combustion engine (ICE) only vehicle. The powertrain 108 includes an ICE 116, one or more electric motors 120, or some combination thereof, and an automatic transmission 124. The automatic transmission 124 could be, for example, a multi-gear, multi-speed automatic transmission. In some implementations, the powertrain 108 could be configured as a multi-mode powertrain such that it has a plurality of different operating modes (electric motors 120 only, electric motors 120 plus the ICE 116, etc.).

As more modes/states become possible by the powertrain 108 and the automatic transmission 124, the computational processing load on the controller 104 increases. In addition, as more complex functionality, such as autonomous/ADAS functionality is added to the vehicle 100, the computational processing load on the controller 104 increases. The controller 104 controls operation of the vehicle 100 and, more particularly, the powertrain 108, based on measured inputs (indicative of vehicle operating parameters) from a plurality of sensors 128. One of these sensors 128 could be a driver interface (not shown), such as an accelerator pedal, via which a driver is able to provide a torque request.

The operation of the controller 104 and, more specifically, the execution of a plurality of functions, will now be described in greater detail. Many of these functions are executable in response to a corresponding function trigger. Non-limiting examples of these vehicle functions include speed control and torque control. Non-limiting examples of the corresponding function triggers include device operating points, such as engine crankshaft and/or electric motor rotational position. For a multi-gear automatic configuration of the transmission 124, for example, functions such as gear shifting, transmission clutch control, and the like could be executed in response to various function triggers. Similarly, for a multi-mode configuration of the powertrain 108, functions such as system enablement/disablement (engine only, motor only, engine+motor, etc.), operating mode (e.g., torque consumer vs. torque generator), and relative operating speeds could be executed in response to various function triggers.

Based on data gathered or collected by the plurality of sensors 128, a set of constraints can be determined. In other words, the operating parameter(s) of the vehicle 100 could indicate a set of constraints, and these constraint(s) could then specify which functions are allowed and which are not. For example, the operating parameters may indicate that the ICE 116 is to be temporarily disabled or shut off, and the corresponding constraint could not allow ICE-related functions. Part of the techniques of the present application involves offline testing or calibration to determine offline testing data that is stored in a memory 132 (of the controller 104 or accessible by the controller 104). This offline testing data indicates runtimes of the plurality of functions executable by the controller 104. These runtimes may also be referred to herein as fixed or static runtimes as they do not vary or depend on dynamically changing operating conditions. These dynamic changes or adjustments to the fixed or static runtimes could be determined online by the controller 104 during its operation. To perform the computational load balancing, the controller 104 is configured to first determine a set of allowed functions from the plurality of functions based on a set of constraints corresponding to a set of operating parameters. This could occur, for example, during a first cycle (e.g., a processing cycle) of the controller 104 and in response to a first instance of the function trigger.

After determining the set of allowed functions, the controller 104 is configured to divide the set of allowed functions into a plurality of subsets to obtain a plurality of subsets of allowed functions. The plurality of subsets of allowed functions, for example, could be executed during a remainder of the first cycle to determine dynamic adjustments to the offline testing data. Then, based on the offline testing data, the controller 104 is configured to equally assign the plurality of subsets of allowed functions across N instances of the function trigger (N being an integer greater than one). In one exemplary implementation, N equals a maximum number of instances of the function trigger per cycle of the controller 104, but it will be appreciated that N could also be a value that is less than this maximum number. This could occur, for example, during or after a first instance of the function trigger during each cycle of the controller 104. In some implementations, this could include assigning the plurality of the subsets of allowed functions over a remainder of the first function trigger instance (if any) and then over a remainder of the N instances of the function trigger. After distributing/assigning the plurality of subsets of allowed functions across the N instances of the function trigger, the controller 104 then executes the set of allowed functions across the N instances of the function trigger as equally assigned to balance a computational load on the controller 104.

In one exemplary implementation, the controller 104 is configured to equally assign the plurality of subsets of allowed functions as follows. First, the controller 104 may determine a total computational load by summing the runtimes of the set of allowed functions as indicated by the offline testing data. Next, the controller 104 may determine an average computational load by dividing the total computational load by N. Finally, the controller 104 could equally assign the plurality of subsets of allowed functions based on the average computational load on the controller 104. This could include, for example, assigning the plurality of subsets of allowed functions such that a total computation load per instance is as close to the average computational load on the controller 104 as possible. In other words, for every function trigger (from 1 till N), the controller 104 assigns allowed functions such that the difference between function runtime and remaining load for that function trigger is minimum. Once all the allowed functions are evaluated, a final solution is then determined (e.g., selected).

Figure 2:
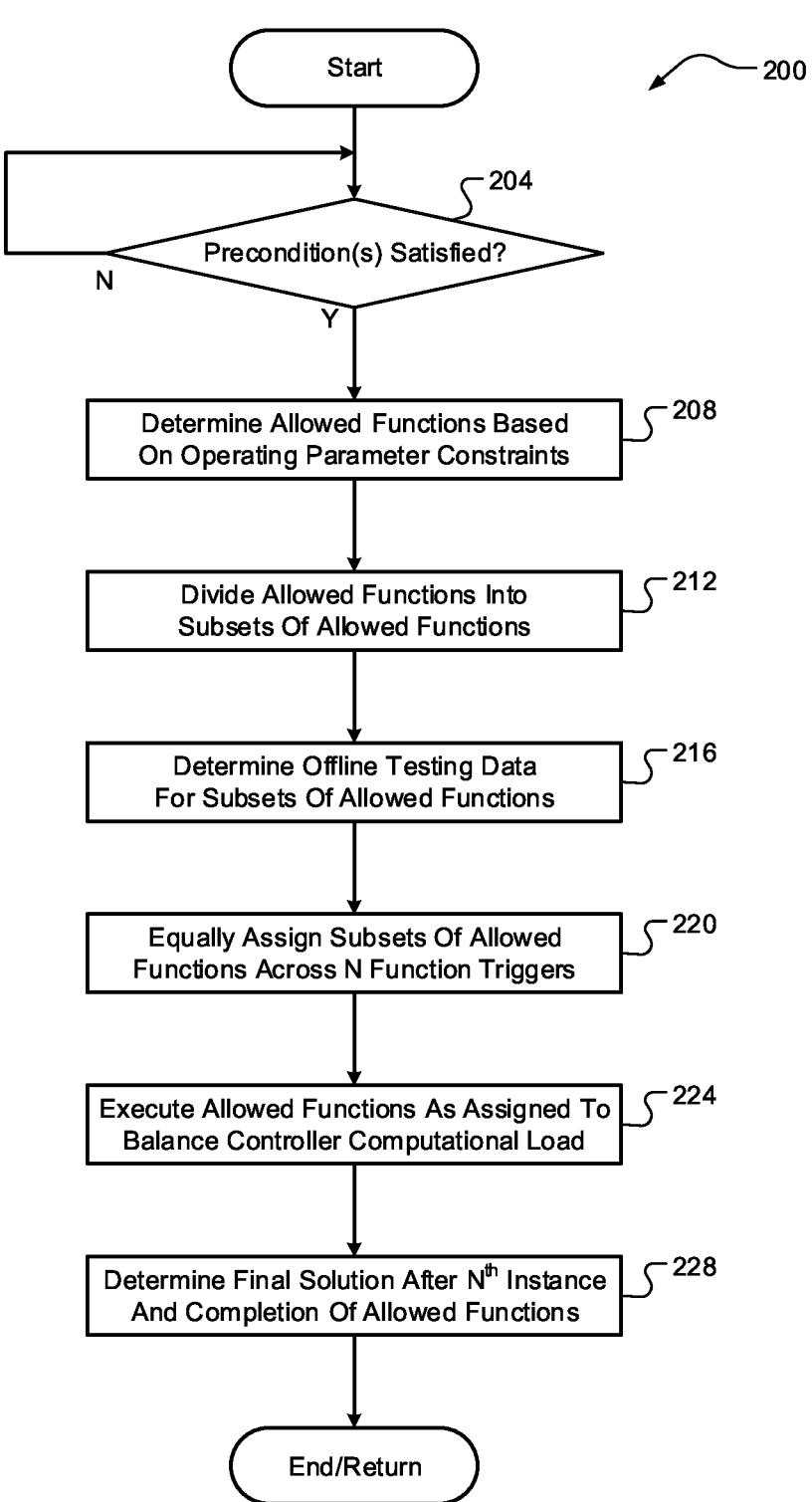
FIG. 2 is a flow diagram of an example control method for balancing controller computational processing loads in a vehicle according to the principles of the present application.

Referring now to FIG. 2, a flow diagram of an example control method 200 for balancing controller computational processing loads in a vehicle according to the principles of the present application is illustrated. While the vehicle 100 and its components (e.g., controller 104) are specifically referenced for illustrative/descriptive purposes, it will be appreciated that the control method 200 could be applicable to any suitable vehicle/controller. At 204, the controller 104 optionally determines whether a set of one or more preconditions are satisfied. Non-limiting examples of these preconditions include the offline testing data (in the memory 132) having been already obtained and there being no malfunctions or faults present that would otherwise affect the operation of the control method 200.

When true, the control method 200 continues to 208. When false, the control method 200 ends or returns to 204. At 208, the controller 104 determines the set of allowed functions from the plurality of functions based on the set of constraints corresponding to the set of operating parameters of the vehicle 100. At 212, the controller 104 divides the set of allowed functions into a plurality of subsets to obtain a plurality of subsets of allowed functions. It will be appreciated that this dividing operation could have been previously performed and thus is not necessary during each execution of the control method 200. At 216, the controller 104 determines (from the memory 132) the offline testing data for the plurality of subsets of allowed functions. At 220, based on the offline testing data, the controller 104 equally assigns the plurality of subsets of allowed functions across N instances of the function trigger. At 224, the controller 104 executes the set of allowed functions across the N instances of the function trigger as equally assigned to balance a computational load on the controller. This could include, equally assigning the plurality of subsets of allowed functions across the remainder of the first function trigger instance (if any) and then across a remainder of the N instances (i.e., N−1 instances) of the function trigger during the current cycle of the controller 104. At 228, the controller 104 determines a final solution (e.g., a selection) after the Nth instance of the function trigger and after the conclusion of the execution of the set of allowed functions. The control method 200 then ends or returns to 204.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for balancing controller computational processing loads in a vehicle, the control system comprising:

a controller configured to control operation of the vehicle including executing at least some of a plurality of functions in response to a function trigger corresponding to a particular operating condition of the vehicle, wherein the plurality of functions include vehicle speed control, vehicle torque control, and vehicle transmission control and the function trigger includes a position of a rotating shaft of the vehicle; and a memory configured to store offline testing data captured by offline testing of the controller executing the plurality of functions, the offline testing data indicating runtimes of the plurality of functions;

wherein the controller is further configured to:

determine a set of allowed functions from the plurality of functions based on a set of constraints corresponding to a set of operating parameters of the vehicle;

divide the set of allowed functions into a plurality of subsets to obtain a plurality of subsets of allowed functions;

based on the offline testing data, equally assign the plurality of subsets of allowed functions across N instances of the function trigger, wherein N is an integer greater than one; and execute the set of allowed functions across the N instances of the function trigger as equally assigned to balance a computational load on the controller.

2. The control system of claim 1, wherein N equals a maximum number of instances of the function trigger per cycle of the controller.

3. The control system of claim 1, wherein during each cycle of the controller, the controller is further configured to:

in response to a first instance of the function trigger, determine the set of allowed functions;

based on the offline testing data, equally assign the plurality of subsets of allowed functions over a remainder of the first instance of the function trigger, if any, and over a remainder of the N instances of the function trigger; and execute the set of allowed functions as equally assigned and determine a final decision for the set of allowed functions thereafter.

4. The control system of claim 1, wherein during each cycle of the controller, the controller is further configured to:

in response to a first instance of the function trigger, determine the set of allowed functions;

based on the offline testing data, equally assign the plurality of subsets of allowed functions over a remainder of the N instances of the function trigger; and execute the set of allowed functions as equally assigned and determine a final decision for the set of allowed functions thereafter.

5. The control system of claim 1, wherein the controller is further configured to:

determine a total computational load on the controller by summing the runtimes of the set of allowed functions as indicated by the offline testing data;

determine an average computational load on the controller by dividing the total computational load by N; and equally assign the plurality of subsets of allowed functions based on the average computational load on the controller.

6. The control system of claim 5, wherein the controller is configured to equally assign the plurality of subsets of allowed functions by assigning the plurality of subsets of allowed functions such that a total computation load per instance is as close to the average computational load on the controller as possible.

7. The control system of claim 1, wherein the vehicle is an electrified vehicle.

8. The control system of claim 7, wherein the vehicle is a hybrid electric vehicle (HEV) having a multi-gear automatic transmission and a multi-mode powertrain.

9. The control system of claim 8, wherein the plurality of vehicle functions include the vehicle speed control and the vehicle torque control and the rotating shaft of the vehicle for the function trigger is one of an engine crankshaft and an electric motor shaft.

10. The control system of claim 8, wherein (the plurality of vehicle functions include the vehicle transmission control and the rotating shaft of the vehicle for the function trigger is a transmission shaft associated with at least one of a gear and a clutch of a transmission of the vehicle.

11. A control method for balancing controller computational processing loads in a vehicle, the control method comprising:

providing a controller configured to control operation of the vehicle including executing at least some of a plurality of functions in response to a function trigger corresponding to a particular operating condition of the vehicle, wherein the plurality of functions include vehicle speed control, vehicle torque control, and vehicle transmission control and the function trigger includes a position of a rotating shaft of the vehicle;

providing a memory configured to store offline testing data captured by offline testing of the controller executing the plurality of functions, the offline testing data indicating runtimes of the plurality of functions;

determining, by the controller, a set of allowed functions from the plurality of functions based on a set of constraints corresponding to a set of operating parameters of the vehicle;

dividing, by the controller, the set of allowed functions into a plurality of subsets to obtain a plurality of subsets of allowed functions;

based on the offline testing data, equally assigning, by the controller, the plurality of subsets of allowed functions across N instances of the function trigger, wherein N is an integer greater than one; and executing, by the controller, the set of allowed functions across the N instances of the function trigger as equally assigned to balance a computational load on the controller.

12. The control method of claim 11, wherein N equals a maximum number of instances of the function trigger per cycle of the controller.

13. The control method of claim 11, further comprising during each cycle of the controller:

in response to a first instance of the function trigger, determining, by the controller, the set of allowed functions;

based on the offline testing data, equally assigning, by the controller, the plurality of subsets of allowed functions over a remainder of the first instance of the function trigger, if any, and over a remainder of the N instances of the function trigger; and executing, by the controller, the set of allowed functions as equally assigned and determine a final decision for the set of allowed functions thereafter.

14. The control method of claim 11, further comprising during each cycle of the controller:

in response to a first instance of the function trigger, determining, by the controller, the set of allowed functions;

based on the offline testing data, equally assigning, by the controller, the plurality of subsets of allowed functions over a remainder of the N instances of the function trigger; and executing, by the controller, the set of allowed functions as equally assigned and determine a final decision for the set of allowed functions thereafter.

15. The control method of claim 11, further comprising:

determining, by the controller, a total computational load on the controller by summing the runtimes of the set of allowed functions as indicated by the offline testing data;

determining, by the controller, an average computational load on the controller by dividing the total computational load by N; and equally assigning, by the controller, the plurality of subsets of allowed functions based on the average computational load on the controller.

16. The control method of claim 15, wherein equally assigning the plurality of subsets of allowed functions includes assigning, by the controller, the plurality of subsets of allowed functions such that a total computation load per instance is as close to the average computational load on the controller as possible.

17. The control method of claim 11, wherein the vehicle is an electrified vehicle.

18. The control method of claim 17, wherein the vehicle is a hybrid electric vehicle (HEV) having a multi-gear automatic transmission and a multi-mode powertrain.

19. The control method of claim 18, wherein the plurality of vehicle functions include the vehicle speed control and the vehicle torque control and the rotating shaft of the vehicle for the function trigger is one of an engine crankshaft and an electric motor shaft.

20. The control method of claim 18, wherein (the plurality of vehicle functions include the vehicle transmission control and the rotating shaft of the vehicle for the function trigger is a transmission shaft associated with at least one of a gear and a clutch of a transmission of the vehicle.

\* \* \* \* \*